(12) United States Patent
Volny et al.

(10) Patent No.: US 10,377,499 B2
(45) Date of Patent: Aug. 13, 2019

(54) CONTINUOUSLY RESTRAINED EVACUATION SYSTEM

(71) Applicant: Goodrich Corporation, Charlotte, NC (US)

(72) Inventors: Jaro Volny, Scottsdale, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/407,852

(22) Filed: Jan. 17, 2017

(65) Prior Publication Data

US 2018/0201382 A1    Jul. 19, 2018

(51) Int. Cl.
*B64D 25/14* (2006.01)
*F16M 13/02* (2006.01)
*A62B 1/20* (2006.01)
*B63B 27/14* (2006.01)

(52) U.S. Cl.
CPC .............. *B64D 25/14* (2013.01); *A62B 1/20* (2013.01); *F16M 13/02* (2013.01); *B63B 2027/145* (2013.01)

(58) Field of Classification Search
CPC .................................. B64D 25/14; A62B 1/20
See application file for complete search history.

(56) References Cited

U.S. PATENT DOCUMENTS

| | | | |
|---|---|---|---|
| 3,391,771 A | | 7/1968 | Day |
| 3,606,939 A | * | 9/1971 | Summer ............... B64D 25/14 |
| | | | 128/DIG. 15 |
| 3,669,217 A | * | 6/1972 | Fisher ................... B64D 25/14 |
| | | | 182/48 |
| 3,793,498 A | | 2/1974 | Matsui |
| 3,897,861 A | * | 8/1975 | Miller ................... B64D 25/14 |
| | | | 182/48 |
| 3,944,023 A | | 3/1976 | Fisher |
| 4,089,545 A | | 5/1978 | Ferry |

(Continued)

FOREIGN PATENT DOCUMENTS

| | | |
|---|---|---|
| EP | 0110206 | 6/1984 |
| EP | 0110206 A1 | 6/1984 |
| EP | 0163925 | 12/1985 |
| EP | 0260354 | 3/1988 |

OTHER PUBLICATIONS

Bahena et al., U.S. Appl. No. 15/405,835, filed Jan. 13, 2017 entitled "Secondary Release Arrangement for Evacuation Slide Systems".

(Continued)

*Primary Examiner* — Alvin C Chin-Shue
(74) *Attorney, Agent, or Firm* — Snell & Wilmer, L.L.P.

(57) ABSTRACT

A restraint arrangement for an evacuation system may comprise a first strap configured to be disposed along a length of the evacuation system, and a second strap configured to be disposed along the length of the evacuation system, wherein the first strap is coupled to the second strap, the first strap is coupled to the evacuation system via a first plurality of attachment members along the length of the evacuation system, the second strap is coupled to the evacuation system via a second plurality of attachment members along the length of the evacuation system, and the first strap is configured to separate from the second strap in response to a predetermined load.

20 Claims, 5 Drawing Sheets

(56) References Cited

U.S. PATENT DOCUMENTS

| | | | |
|---|---|---|---|
| 4,460,062 | A | 7/1984 | Fisher |
| 4,526,262 | A | 7/1985 | Malcolm |
| 4,567,977 | A | 2/1986 | Fisher |
| 4,850,295 | A | 7/1989 | Weaver |
| 5,195,217 | A | 3/1993 | Arntzen |
| 5,711,495 | A | 1/1998 | Danielson |
| 5,871,180 | A | 2/1999 | Hublikar |
| 6,814,183 | B2 | 11/2004 | Horvath |
| 8,066,108 | B2 | 11/2011 | Hentges |
| 9,296,484 | B2 | 3/2016 | Biro |
| 2002/0175024 | A1 | 11/2002 | Kurtgis |
| 2004/0094361 | A1 | 5/2004 | Gronlund et al. |
| 2012/0090521 | A1* | 4/2012 | Zablocki ............ B63B 43/10 114/121 |
| 2013/0200217 | A1 | 8/2013 | Biro |
| 2013/0256159 | A1* | 10/2013 | Walsh ............ A45C 11/16 206/6.1 |
| 2014/0224937 | A1 | 8/2014 | Brown |
| 2015/0097083 | A1 | 4/2015 | Rellmann |
| 2016/0107755 | A1 | 4/2016 | Bessettes et al. |

OTHER PUBLICATIONS

Haynes et al., U.S. Appl. No. 15/405,854, filed Jan. 13, 2017 entitled "Light Weight Restraint for Evacuation Slide Systems".

Volny et al., U.S. Appl. No. 15/407,818, filed Jan. 17, 2017 entitled "Shock Absorbing Evacuation System Restraint".

Extended European Search Report dated Feb. 7, 2018 in European Application No. 18150447.3.

Extended European Search Report dated Feb. 22, 2018 in European Application No. 18151883.8.

European Patent Office, European Search Report dated Mar. 2, 2018 in Application 18150481.2.

European Patent Office, European Search Report dated Mar. 27, 2018 in Application No. 18150827.6—1010.

USPTO,Restriction/Election Requirement dated Jan. 30, 2019 in U.S. Appl. No. 15/407,818.

USPTO, Non Final Office Action dated Apr. 12, 2019 in U.S. Appl. No. 15/407,818.

* cited by examiner

CONTINUOUSLY RESTRAINED EVACUATION SYSTEM

FIELD

The present disclosure relates to inflatable evacuation systems and, in particular, to restraint systems and methods for evacuation slides.

BACKGROUND

Emergency evacuation slides may be used to exit an aircraft absent a jet way or other suitable means of egress for passengers. The slides may deploy from a door sill or a side of the aircraft fuselage, for example. The slide deployment is typically controlled by restraints placed throughout the length of the slide which release in stages in response to internal slide pressure.

SUMMARY

In various embodiments, a restraint arrangement for an evacuation system is disclosed. A restraint arrangement for an evacuation system may comprise a first strap configured to be disposed along a length of the evacuation system, and a second strap configured to be disposed along the length of the evacuation system, wherein the first strap is coupled to the second strap, the first strap is coupled to the evacuation system via a first plurality of attachment members along the length of the evacuation system, the second strap is coupled to the evacuation system via a second plurality of attachment members along the length of the evacuation system, and the first strap is configured to separate from the second strap in response to a predetermined load.

In various embodiments, the first strap may be sewn to the second strap via a thread. The predetermined load may be transferred between the first strap and the second strap in response to an internal pressure of the evacuation system. The thread may be configured to separate in response to the load. The first strap may be configured to peel away from the second strap in response to the separation of the thread. At least one of the first strap and the second strap may comprise a nylon webbing. The first strap may comprise a first side and a second side, the second strap may comprise a third side and a fourth side, and the first side may be in contact with the third side. The first plurality of attachment members may be coupled to the second side, the second plurality of attachment members may be coupled to the fourth side, the first side may be located opposite the second side, and the third side may be located opposite the fourth side. The evacuation system may be configured to unfold in response to the first strap separating from the second strap.

In various embodiments, an evacuation system is disclosed. An evacuation system may comprise an evacuation slide, the evacuation slide being inflatable, a restraint arrangement for the evacuation system comprising a first strap configured to be disposed along a length of the evacuation system, and a second strap configured to be disposed along the length of the evacuation system, wherein the first strap is coupled to the second strap, the first strap is coupled to the evacuation slide via a first plurality of attachment members along the length of the evacuation slide, the second strap is coupled to the evacuation slide via a second plurality of attachment members along the length of the evacuation slide, and the first strap is configured to separate from the second strap in response to a predetermined load.

In various embodiments, the first strap may be sewn to the second strap via a thread. The predetermined load may be transferred between the first strap and the second strap in response to an internal pressure of the evacuation system. The thread may be configured to separate in response to the load. The first strap may be configured to peel away from the second strap in response to the separation of the thread. At least one of the first strap and the second strap may comprise a nylon webbing. The first strap may comprise a first side and a second side, the second strap may comprise a third side and a fourth side, and the first side may be in contact with the third side. The first plurality of attachment members may be coupled to the second side, the second plurality of attachment members may be coupled to the fourth side, the first side may be located opposite the second side, and the third side may be located opposite the fourth side. The evacuation slide may be configured to unfold in response to the first strap separating from the second strap.

In various embodiments, a method for manufacturing an evacuation slide is disclosed. A method for manufacturing an evacuation slide may comprise coupling, via a thread, a first strap to a second strap, disposing the first strap and the second strap along a length of the evacuation slide, coupling, via a first plurality of attachment members, the first strap to the evacuation slide along the length of the evacuation slide, and coupling, via a second plurality of attachment members, the second strap to the evacuation slide along the length of the evacuation slide.

In various embodiments, the method may further comprise moving the evacuation slide to a folded position, wherein the first strap and the second strap maintain the evacuation slide in the folded position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface in a fully deployed position. During deployment, a releasable restraint arrangement may aid in controlling the inflation process of the slide. Restraint arrangements of the present disclosure may be configured to de-couple in response to internal slide pressure. Restraint arrangements of the present disclosure may aid in meeting wind requirements for slide deployment. Restraint arrangements of the present disclosure may provide decreased packing density and weight savings. Restraint arrangements of the present disclosure may provide smooth unfolding and inflation of an evacuation slide.

Figure 1:
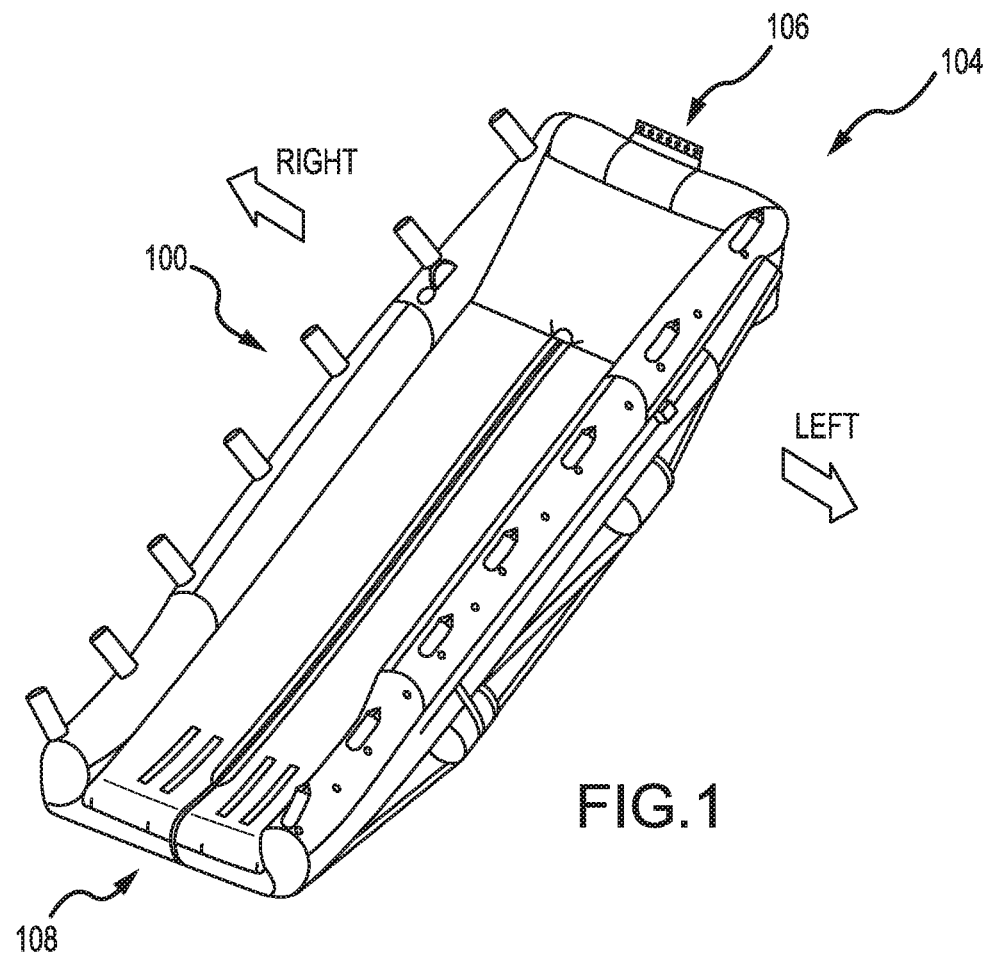
FIG. 1 illustrates a perspective view of an evacuation slide in a deployed position, in accordance with various embodiments.
Figure 3A:
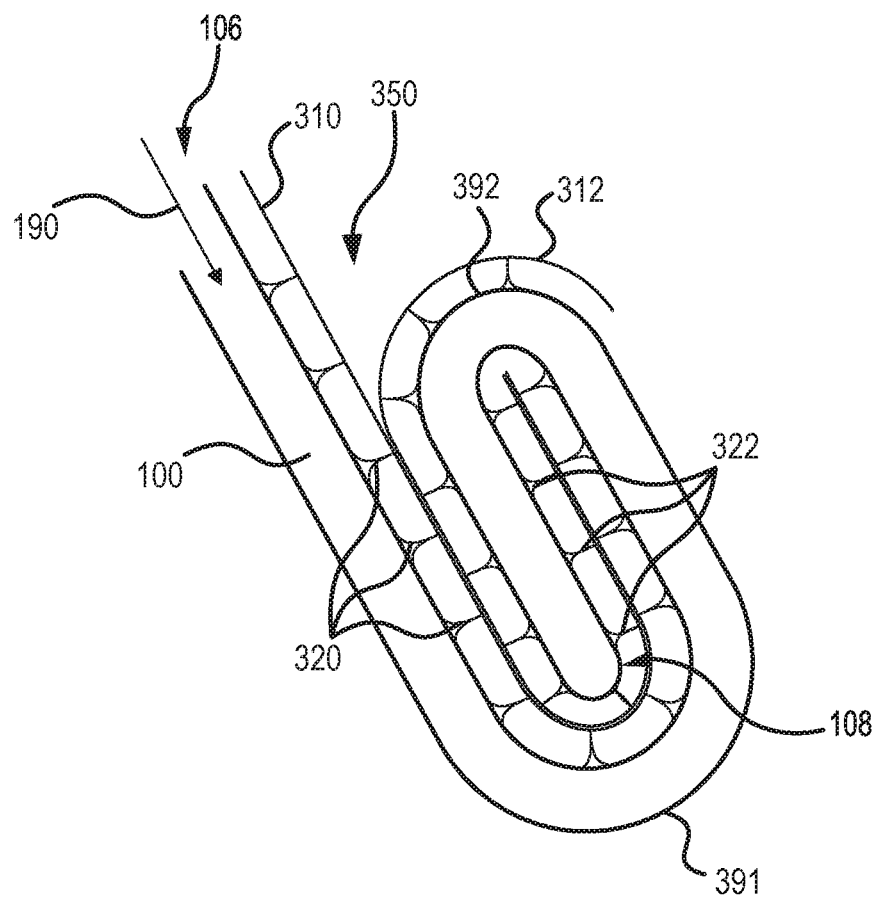
FIGS. 3A, 3B, and 3C illustrate an evacuation slide during various stages of deployment, in accordance with various embodiments.
Figure 4:
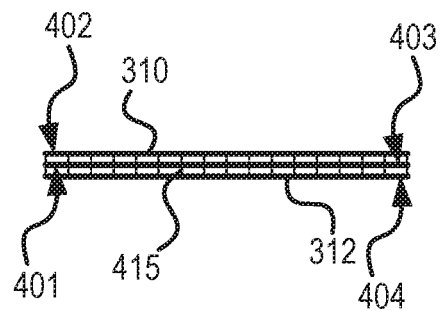
FIG. 4 illustrates a first strap coupled to a second strap via a thread, in accordance with various embodiments.
Figure 3B:
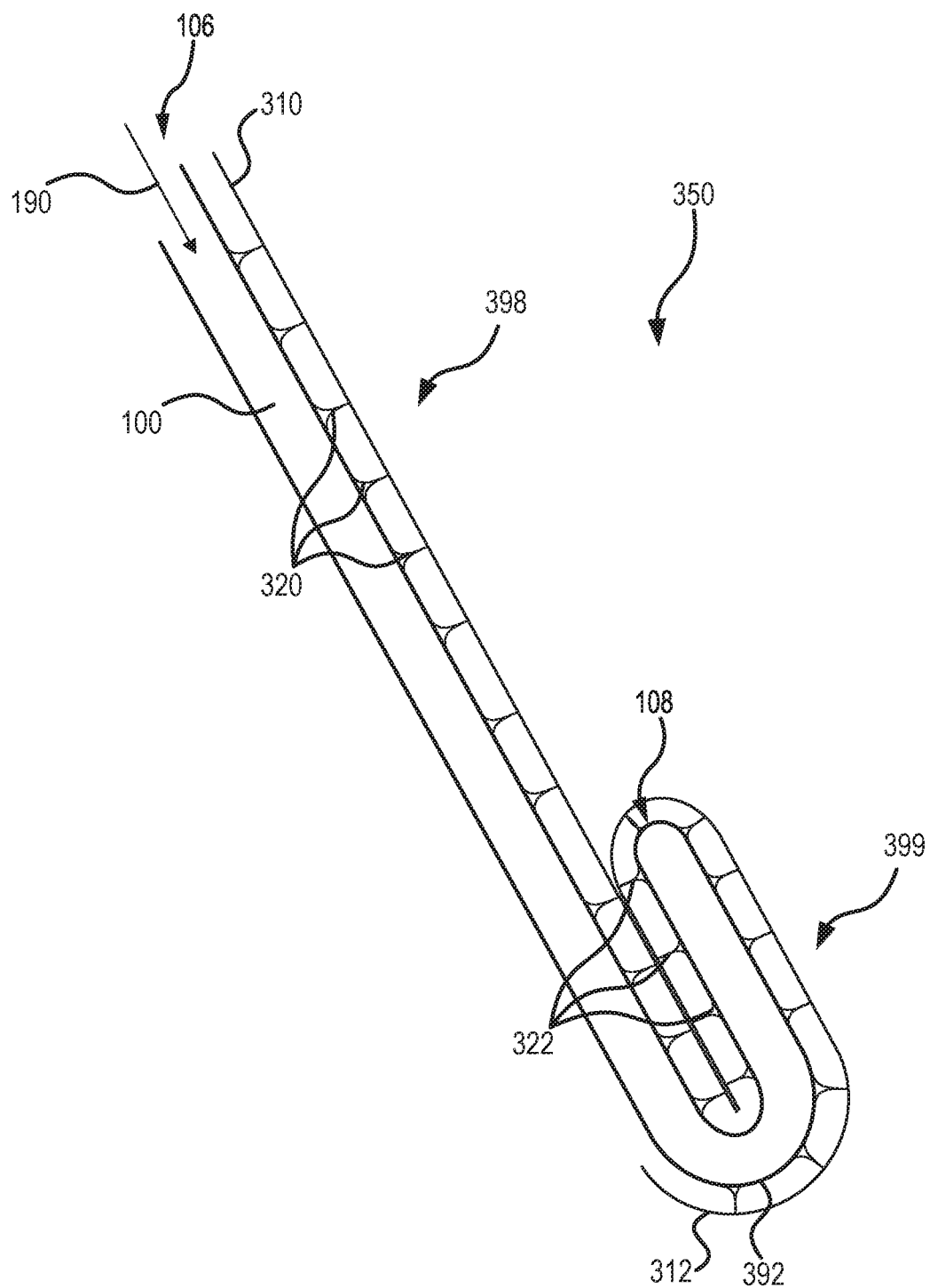

With respect to FIG. 3A through FIG. 4, elements with like element numbering, as depicted in FIG. 1, are intended to be the same and will not necessarily be repeated for the sake of clarity. With respect to FIG. 3B through FIG. 4, elements with like element numbering, as depicted in FIG. 3A, are intended to be the same and will not necessarily be repeated for the sake of clarity.

With reference to FIG. 1, an evacuation system 104 is illustrated, in accordance with various embodiments. Evacuation system 104 may comprise evacuation slide 100. Evacuation slide 100 may comprise a head end 106 and a toe end 108. Head end 106 may be coupled to aircraft structure. Evacuation slide 100 may comprise an inflatable slide. FIG. 1 illustrates evacuation slide 100 in an inflated and/or deployed position. Evacuation slide 100 may comprise a dual lane slide. However, evacuation slide 100 may comprise any number of lanes. Toe end 108 may contact an exit surface in response to evacuation slide 100 being deployed.

Figure 2:
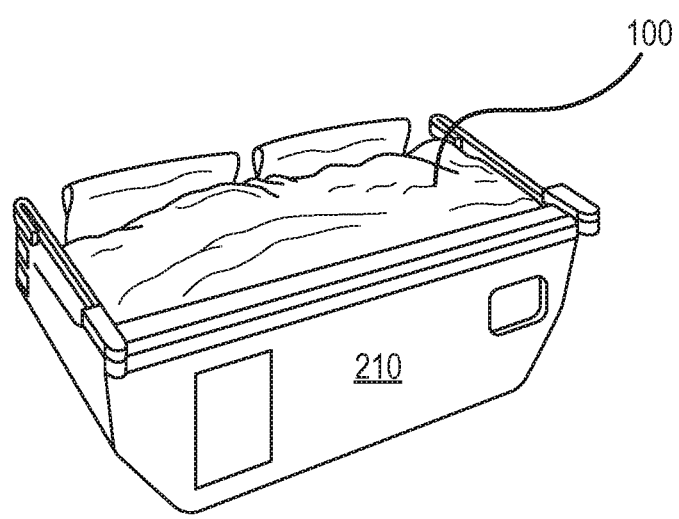
FIG. 2 illustrates a perspective view of an evacuation slide in a stowed position, in accordance with various embodiments.

With reference to FIG. 2, evacuation slide 100 is illustrated in a stowed and/or packed position. In this regard, evacuation slide 100 may be stowed in a packboard 210. In various embodiments, evacuation slide 100 may be folded in the stowed position. In various embodiments, evacuation slide 100 may be deployed from packboard 210 in response to opening an emergency exit door. Packboard 210 may be coupled to an aircraft in an installed position. Typically, a packboard 210 includes a blow-out panel which opens in response to deployment of evacuation slide 100 through which opening the inflatable may exit the packboard. In this regard, evacuation slide 100 may be configured to be deployed from an aircraft.

With reference to FIG. 3A, evacuation slide 100 is illustrated in a folded position after being deployed from packboard 210, with momentary reference to FIG. 2, in accordance with various embodiments. In this regard, FIG. 3 illustrates evacuation slide 100 during deployment, in a partially deployed position. A flow of air 190 may enter evacuation slide 100. Flow of air 190 may be received by a compressed cylinder to inflate evacuation slide 100. Evacuation slide 100 may include a plurality of folds, including first fold 391 and second fold 392, when evacuation slide 100 is in the folded or stowed position. A restraint arrangement 350 may aid in maintaining first fold 391 and/or second fold 392. Restraint arrangement 350 may aid in deployment of evacuation slide 100. Restraint arrangement 350 may comprise a first strap 310 and a second strap 312. In various embodiments, first strap 310 and/or second strap 312 may comprise a rope, tape, ribbon, webbing, or any other suitable strap. In various embodiments, first strap 310 and/or second strap 312 materials may comprise nylon, ballistic nylon, polypropylene, polyester, cotton, or any other suitable material. For example, first strap 310 and second strap 312 may comprise a nylon webbing.

Restraint arrangement 350 may comprise a first plurality of attachment members 320 and a second plurality of attachment members 322. First plurality of attachment members 320 may be configured to couple first strap 310 to evacuation slide 100. Second plurality of attachment member 322 may be configured to couple second strap 312 to evacuation slide 100. In various embodiments, first plurality of attachment members 320 and second plurality of attachment members 322 may comprise rope, tape, ribbon, webbing, or any other suitable members for attaching first strap 310 and second strap 312 to evacuation slide 100. In various embodiments, first plurality of attachment members 320 and second plurality of attachment members 322 may comprise nylon, ballistic nylon, polypropylene, polyester, cotton, or any other suitable material. For example, first plurality of attachment members 320 and second plurality of attachment members 322 may comprise may comprise a nylon webbing. In various embodiments, first plurality of attachment members 320 and second plurality of attachment members 322 may be attached to first strap 310, second strap 312, and/or evacuation slide 100 via an adhesive and/or by a sewing process.

In various embodiments, first strap 310 and second strap 312 may wrap around toe end 108, when evacuation slide 100 is in the folded position as illustrated in FIG. 3A.

With reference to FIG. 3B, evacuation slide 100 is illustrated in a partially folded position, in accordance with various embodiments. Evacuation slide 100 may unfold in response to first strap 310 separating from second strap 312. FIG. 3B illustrates portion 398 of first strap 310 separated from portion 399 of second strap 312. First strap 310 may be configured to separate from second strap 312 in response to an internal pressure in evacuation slide 100. Evacuation slide 100 may begin to inflate and an internal pressure of evacuation slide 100 may increase. Restraint arrangement 350 may maintain evacuation slide 100 in a folded position until the internal pressure has increased above a predetermined threshold value. Evacuation slide 100 may unfold in response to restraint arrangement 350 separating. In this regard, evacuation slide 100 may fully deploy in response to restraint arrangement 350 separating.

In various embodiments, first strap 310 may separate from second strap 312, in response to a predetermined force, or load, between first strap 310 and second strap 312. Said force may be generated in response to the internal pressure of the evacuation slide 100, for example during inflation. In various embodiments, restraint arrangement 350 may be configured to separate in response to a force of between 150 pounds and 700 pounds (667 N-3114 N), and in various embodiments in response to a force of between 170 pounds and 600 pounds (756 N-2669 N), and in various embodiments, in response to a force of between 170 pounds and 300 pounds (756 N-1334 N). In various embodiments, said force may comprise a tensile force.

In various embodiments, restraint arrangement 350 may separate in a continuous fashion. In this regard, with combined reference to FIG. 4 and FIG. 3B, first strap 310 may begin to separate from second strap 312 near head end 106 and separate a thread 415 in a continuous or constant manner along the length of evacuation slide 100 towards toe end 108. Stated differently, first strap 310 may be configured to peel away from second strap 312. Thread 415 may be configured to separate in response to a load between first strap 310 and second strap 312.

Figure 3C:
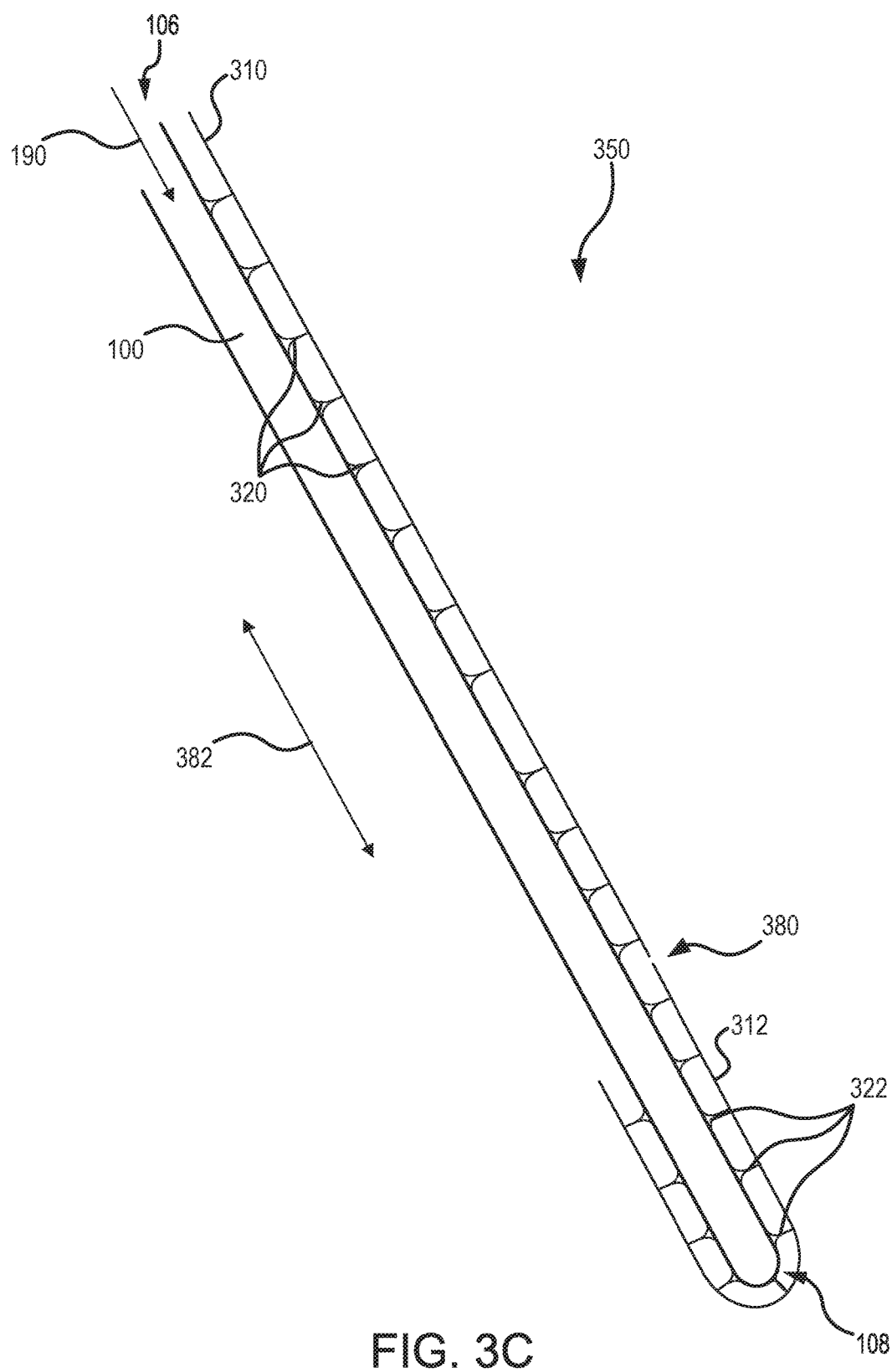

With reference to FIG. 3C, evacuation slide 100 is illustrated in a fully deployed position with first strap 310 completely separated from second strap 312. Although the illustrated embodiment illustrates first strap 310 separated from second strap 312 at location 380, it is contemplated herein that first strap 310 may be coupled to second strap 312 at location 380 to form one continuous strap.

In various embodiments, second strap 312 may wrap around toe end 108 of evacuation slide. In various embodiments, first strap 310 may extend between toe end 108 and head end 106. First strap 310 may be spaced from toe end 108. First strap 310 may extend along a length of evacuation slide 100, wherein the direction of the length of evacuation slide 100 is illustrated by arrow 382. Second strap 312 may extend along a length of evacuation slide 100

With reference to FIG. 4, first strap 310 and second strap 312 are illustrated, in accordance with various embodiments. First strap 310 may be sewn to second strap 312. Stated differently, first strap 310 may be coupled to second strap 312 via thread 415. Thread 415 may extend between first strap 310 and second strap 312.

In various embodiments, first strap 310 may be placed in alignment over second strap 312. First strap 310 may comprise a first side 401 and a second side 402. First side 401 may be located opposite second side 402. Second strap 312 may comprise a first side (also referred to herein as a third side) 403 and a second side (also referred to herein as a fourth side) 404. First side 403 may be in contact with first side 401. First side 401 may be substantially covered by first side 403. With combined reference to FIG. 3A and FIG. 4, second side 402 may be coupled to first plurality of attachment members 320. Second side 404 may be coupled to second plurality of attachment members 322.

Figure 5:
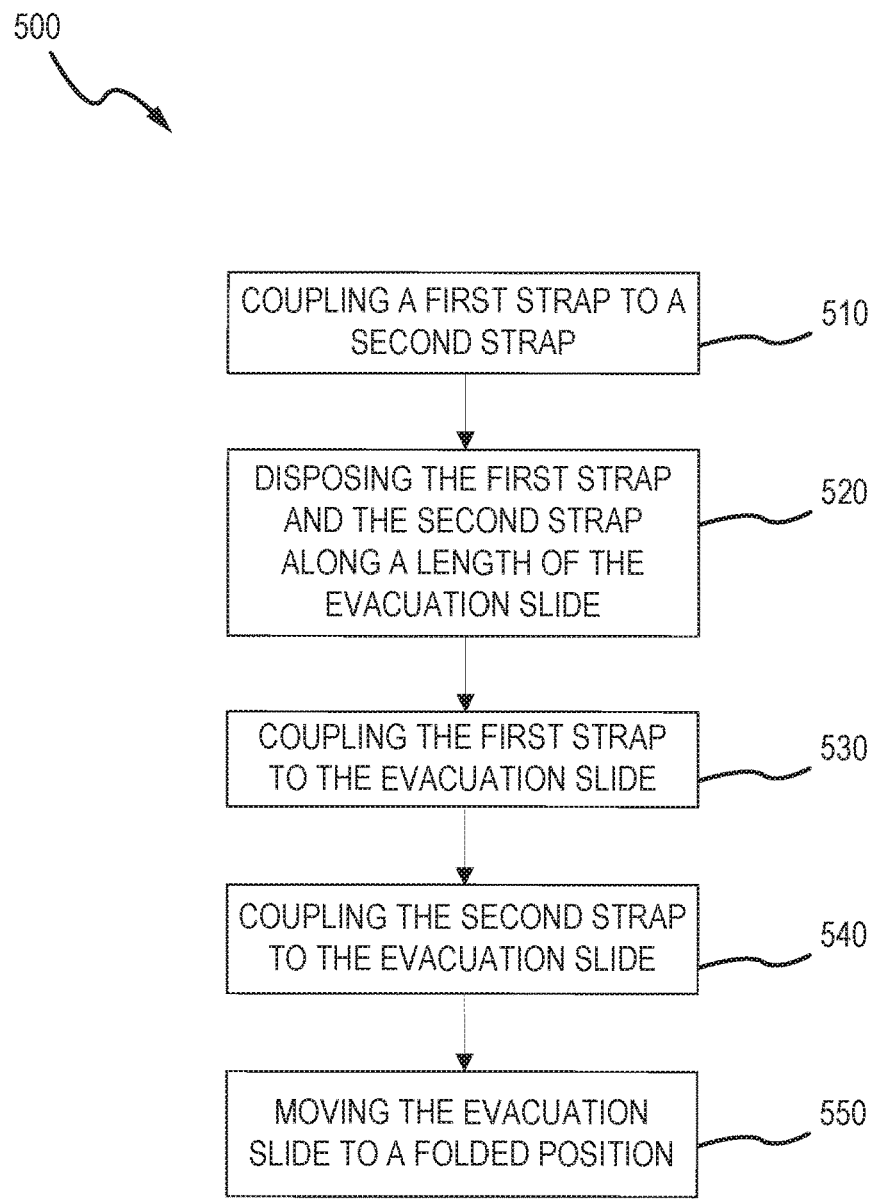
FIG. 5 illustrates a method for manufacturing an evacuation slide, in accordance with various embodiments.

With reference to FIG. 5, a method 500 for manufacturing an evacuation slide is provided, in accordance with various embodiments. Method 500 includes coupling a first strap to a second strap (step 510). Method 500 includes disposing the first strap and the second strap along a length of the evacuation slide (step 520). Method 500 includes coupling the first strap to the evacuation slide (step 530). Method 500 includes coupling the second strap to the evacuation slide (step 540). Method 500 may include moving the evacuation slide to a folded position (step 550).

With combined reference to FIG. 3C, FIG. 4, and FIG. 5, step 510 may include coupling, via thread 415, first strap 310 to a second strap 312. Step 520 may include disposing first strap 310 and second strap 312 along a length 382 of evacuation slide 100. Step 530 may include coupling, via first plurality of attachment members 320, first strap 310 to evacuation slide 100 along length 382 of evacuation slide 100. Step 540 may include coupling, via second plurality of attachment members 322, second strap 312 to evacuation slide 100 along length 382 of evacuation slide 100. Step 550 may include moving evacuation slide 100 to a folded position, wherein first strap 310 and second strap 312 maintain evacuation slide 100 in the folded position.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint arrangement for an evacuation system comprising:
    a first strap configured to be disposed along a length of the evacuation system; and
    a second strap configured to be disposed along the length of the evacuation system;

wherein the first strap is coupled to the second strap,
the first strap is coupled to the evacuation system via a first plurality of attachment members along the length of the evacuation system,
the second strap is coupled to the evacuation system via a second plurality of attachment members along the length of the evacuation system, and
the first strap is configured to separate from the second strap in response to a predetermined load,
wherein the second strap wraps around an end of the evacuation system.

2. The restraint arrangement of claim 1, wherein the first strap is sewn to the second strap via a thread.

3. The restraint arrangement of claim 2, wherein the predetermined load is transferred between the first strap and the second strap in response to an internal pressure of the evacuation system.

4. The restraint arrangement of claim 3, wherein the thread is configured to separate in response to the load.

5. The restraint arrangement of claim 4, wherein the first strap is configured to peel away from the second strap in response to the separation of the thread.

6. The restraint arrangement of claim 5, wherein at least one of the first strap and the second strap comprises a nylon webbing.

7. The restraint arrangement of claim 6, wherein
the first strap comprises a first side and a second side,
the second strap comprises a third side and a fourth side, and
the first side is in contact with the third side.

8. The restraint arrangement of claim 7, wherein
the first plurality of attachment members are coupled to the second side,
the second plurality of attachment members are coupled to the fourth side,
the first side is located opposite the second side, and
the third side is located opposite the fourth side.

9. The restraint arrangement of claim 8, wherein the evacuation system is configured to unfold in response to the first strap separating from the second strap.

10. An evacuation system comprising:
an evacuation slide, the evacuation slide being inflatable;
a restraint arrangement for the evacuation system comprising:
a first strap configured to be disposed along a length of the evacuation system; and
a second strap configured to be disposed along the length of the evacuation system;
wherein the first strap is coupled to the second strap,
the first strap is coupled to the evacuation slide via a first plurality of attachment members along the length of the evacuation slide,
the second strap is coupled to the evacuation slide via a second plurality of attachment members along the length of the evacuation slide,
the first strap is configured to separate from the second strap in response to a predetermined load, and
the second strap wraps around an end of the evacuation system.

11. The evacuation system of claim 10, wherein the first strap is sewn to the second strap via a thread.

12. The evacuation system of claim 11, wherein the predetermined load is transferred between the first strap and the second strap in response to an internal pressure of the evacuation system.

13. The evacuation system of claim 12, wherein the thread is configured to separate in response to the load.

14. The evacuation system of claim 13, wherein the first strap is configured to peel away from the second strap in response to the separation of the thread.

15. The evacuation system of claim 14, wherein at least one of the first strap and the second strap comprises a nylon webbing.

16. The evacuation system of claim 15, wherein
the first strap comprises a first side and a second side,
the second strap comprises a third side and a fourth side, and
the first side is in contact with the third side.

17. The evacuation system of claim 16, wherein
the first plurality of attachment members are coupled to the second side,
the second plurality of attachment members are coupled to the fourth side,
the first side is located opposite the second side, and
the third side is located opposite the fourth side.

18. The evacuation system of claim 17, wherein the evacuation slide is configured to unfold in response to the first strap separating from the second strap.

19. A method for manufacturing an evacuation slide, comprising:
coupling a first strap to a second strap;
disposing the first strap and the second strap along a length of the evacuation slide, wherein the second strap wraps around an end of the evacuation slide;
coupling, via a first plurality of attachment members, the first strap to the evacuation slide along the length of the evacuation slide; and
coupling, via a second plurality of attachment members, the second strap to the evacuation slide along the length of the evacuation slide.

20. The method according to claim 19, further comprising:
moving the evacuation slide to a folded position, wherein the first strap and the second strap maintain the evacuation slide in the folded position.

* * * * *